US008620574B2

(12) United States Patent  
Carlsson

(10) Patent No.: US 8,620,574 B2  
(45) Date of Patent: Dec. 31, 2013

(54) METHOD AND SYSTEM FOR CALCULATING A QUANTITY FOR A ROUTE SEGMENT EXTENDING BETWEEN TWO POINTS ON A DIGITAL MAP

(75) Inventor: Stefan Nils Olof Carlsson, Bjärred (SE)

(73) Assignee: Vodafone Group PLC, Newbury, Berkshire (GB)

( * ) Notice: Subject to any disclaimer, the term of this patent is extended or adjusted under 35 U.S.C. 154(b) by 358 days.

(21) Appl. No.: 12/932,711

(22) Filed: Mar. 3, 2011

(65) Prior Publication Data

US 2012/0010814 A1   Jan. 12, 2012

(30) Foreign Application Priority Data

Mar. 3, 2010  (GB) .................................. 1003522.8

(51) Int. Cl.
| | |
|---|---|
| *G06F 17/00* | (2006.01) |
| *G06F 19/00* | (2011.01) |
| *G08G 1/0967* | (2006.01) |
| *G08G 1/0968* | (2006.01) |
| *G01C 21/00* | (2006.01) |

(52) U.S. Cl.  
USPC ........... 701/409; 701/414; 701/423; 701/424; 340/995.13; 340/995.14

(58) Field of Classification Search  
USPC ......... 701/400, 408, 409, 410, 411, 414, 415, 701/423, 424, 450, 451, 452, 461, 465, 467, 701/468, 516, 526, 532, 533; 340/988, 994, 340/995.14, 995.15, 995.19, 995.2, 995.21, 340/995.23, 995.26, 995.27, 995.13  
See application file for complete search history.

(56) References Cited

U.S. PATENT DOCUMENTS

| 8,024,110 | B2* | 9/2011 | Fushiki et al. ................ 701/119 |
|---|---|---|---|
| 2003/0069683 | A1* | 4/2003 | Lapidot et al. ................ 701/117 |
| 2005/0209772 | A1 | 9/2005 | Yoshikawa et al. |
| 2006/0178811 | A1 | 8/2006 | Liu et al. |
| 2008/0234921 | A1* | 9/2008 | Groenhuijzen et al. ...... 701/118 |
| 2009/0043486 | A1 | 2/2009 | Yang et al. |

FOREIGN PATENT DOCUMENTS

| DE | 10 329 504 A1 | 2/2005 |
|---|---|---|
| EP | 1 387 145 A1 | 2/2004 |
| EP | 1 580 531 A2 | 9/2005 |

* cited by examiner

*Primary Examiner* — Thomas Tarcza  
*Assistant Examiner* — Edward Pipala  
(74) *Attorney, Agent, or Firm* — Muirhead and Saturnelli, LLC

(57) ABSTRACT

A method and system are provided for calculating a quantity for a route segment extending between two points on a digital map, the points corresponding to two geographical locations, the quantity representing a distance between the two geographical locations or an estimated time for travelling between the two geographical locations, the method comprising; determining a base quantity for the route segment, determining a first parameter corresponding to a first condition between the two geographical locations, determining a second parameter corresponding to a second condition between the two geographical locations, determining an additional quantity based on the first parameter and the second parameter such that the influence of the second parameter on the size of the additional quantity depends on the first parameter, calculating a modified quantity for the route segment based on the base quantity and the additional quantity, and generating a signal based on the modified quantity.

18 Claims, 3 Drawing Sheets

METHOD AND SYSTEM FOR CALCULATING A QUANTITY FOR A ROUTE SEGMENT EXTENDING BETWEEN TWO POINTS ON A DIGITAL MAP

TECHNICAL FIELD

The system described herein generally relates to navigation systems. More specifically, the system described herein relates to a method for calculating a quantity for a route segment extending between two points on a digital map, and a corresponding system as well as a computer program product.

BACKGROUND OF THE INVENTION

Today it is common to use some kind of navigation system when preparing a journey as well as during a journey (e.g. by foot, by bike or by car) from one location to another. A navigation system may e.g. be a web mapping service with road route planning functionality, or a positioning system such as GPS. Such navigation systems are capable of calculating route suggestions which then may be followed to reach a desired destination.

To accomplish this, a navigation system may use coordinate data for a plurality of geographical locations as well as data relating to how these locations are connected. Typically, this data may be stored in a graph data structure wherein the nodes represent the geographical locations and the edges or links connecting the nodes represent how these locations are connected. For example, a link connecting two nodes may represent a road segment extending between the geographical locations represented by the nodes. Two connected nodes thus make up a route segment in the navigation system, which route segment may correspond to a road segment extending between the geographical locations. Longer routes may be formed from a plurality of consecutive and connected route segments in the graph.

Each route segment has an associated base quantity corresponding to a time for traversing a corresponding road segment at a given speed (e.g. a ratio of the length of the road segment over the legal speed limit along the road segment) or a distance of the corresponding road segment. The total base quantity for a complete route is the sum of the base quantities of the route segments making up the complete route.

Generally, the route suggested by a navigation system corresponds to the most efficient way of reaching the destination (e.g. in terms of distance or time). The most efficient route corresponds to the route having the smallest sum of base quantities. This route is commonly calculated using the Dijkstra graph-traversal algorithm or variants thereof.

The base quantity of a route segment is generally a predetermined quantity which does not reflect dynamic conditions along the corresponding road segment. In order to improve route suggestions and travel time estimates in view of dynamic conditions some navigation systems take traffic flow along the route segments into account. The traffic flow may be a predicted traffic flow or a real-time traffic flow. Some navigation systems also take incident information into account. The incident information is commonly reported to a navigation system by a third-party reporting facility. For example, if an incident occurs along a road segment corresponding to a route segment the facility may report an "incident number" indicative of the severity of the incident. The incident number may e.g. be an integer on a standardized scale (e.g. 1 and 5) where a small integer may indicate a small incident and large integer may indicate a major incident. Different standardizations and different grading of incidents may be used in different environments and countries.

When both traffic flow and incident information is available in a prior art navigation system, their delaying effects on a route segment are estimated separately from each other. An updated quantity of the affected route segment is then determined as the sum of the base quantity of the route segment, an estimated delaying effect of the traffic flow and an estimated delaying effect of the incident number.

Accordingly, it would be desirable to provide an improved way of calculating quantities for a route segment compared to the prior art. Specifically, it would be desirable to provide a more accurate way for calculating quantities for a route segment in view of more than one road condition.

SUMMARY

In accordance with a first aspect of the system described herein, there is provided a method for calculating a quantity for a route segment extending between two points on a digital map, the points corresponding to two geographical locations, the quantity representing a distance between the two geographical locations or an estimated time for travelling between the two geographical locations, the method comprising; determining a base quantity for the route segment, determining a first parameter corresponding to a first condition between the two geographical locations, determining a second parameter corresponding to a second condition between the two geographical locations, determining an additional quantity based on the first parameter and the second parameter such that the influence of the second parameter on the size of the additional quantity depends on the first parameter, calculating a modified quantity for the route segment based on the base quantity and the additional quantity, and generating a signal based on the modified quantity.

The system described herein is based on the insight that the prior-art way of improving route calculations in view of road conditions does not realistically model how multiple simultaneous conditions may affect accessibility of a road segment. By the method according to the system described herein more accurate route suggestions and estimation of travel times may be obtained since the method provides a more realistic way of taking multiple conditions into account compared to the prior art. For example, the actual impact, e.g. the delay, caused by a condition during a journey between the two geographical locations may in many cases depend on other conditions between the two geographical locations. The described additional quantity efficiently reflects this combined effect of the first and the second parameters. The method according to the system described herein thus enables both route suggestions and estimation of arrival times of higher accuracy.

According to one embodiment calculating the modified quantity comprises calculating a sum of the base quantity and the additional quantity. This embodiment provides a computationally efficient way of determining a modified quantity for a route segment while taking the impact of multiple conditions into account.

Various ways of determining the described additional quantity are contemplated:

According to one embodiment, determining the additional quantity comprises determining the additional quantity based on a product of the first parameter and the second parameter. This embodiment provides a particularly efficient and simple way of determining the additional quantity.

According to an alternative embodiment, determining the additional quantity comprises determining the additional quantity by scaling the second parameter based on the first parameter or determining the additional quantity by scaling the first parameter based on the second parameter. In some cases this embodiment may provide a way of modeling the combined effect of the first and second conditions also in cases where the combined effect not may be realistically described by a multiplication. For example, the first parameter may be compared to a threshold wherein the second parameter may be scaled by a first factor if the first parameter exceeds the threshold and a second factor if the traffic flow falls below the threshold.

The above-mentioned embodiments provide efficient ways of determining the additional quantity such that it reflects that the actual delay caused by the first condition (or second condition) during a journey between the two geographical locations in many cases may depend on the second condition (or first condition) between the two geographical locations.

According to one embodiment, the route segment corresponds to a road segment extending between the two geographical locations.

According to one embodiment, the first condition corresponds to a traffic flow along the road segment. The first parameter may comprise a ratio of the traffic flow and a traffic flow capacity of the road segment. The first parameter may be based on prevailing traffic flow data, predicted traffic flow data, or historical traffic flow data. If there is a low traffic flow the delaying effect of the second parameter may be relatively small. However, if there is a large traffic flow, the impact of the second parameter may increase.

With reference to the above-mentioned "scaling embodiments", the threshold may be the traffic flow capacity of the road segment.

According to one embodiment, the second condition is any one of: an occurrence of an event along the road segment, an environmental condition along the road segment, and a road condition along the road segment. The second parameter may be based on a degree of seriousness of the second condition. The second parameter may be based on prevailing condition data, predicted condition data, or historical condition data.

If there is a low traffic flow the delaying effect of e.g. a road accident may be relatively small. However, if there is a large traffic flow the impact of the road accident may increase.

According to one embodiment, the route segment is one among a plurality of route segments forming a route.

According to one embodiment, the method may further comprise modifying the route based on the modified quantity. A calculated route or a route suggestion may thus be updated if traffic conditions and/or environmental conditions change.

According to a second aspect of the system described herein, there is provided a system for calculating a quantity for a route segment extending between two points on a digital map, the points corresponding to two geographical locations, the quantity representing a distance between the two geographical locations or an estimated time for travelling between the two geographical locations, the system comprising;

a base quantity determining device that determines a base quantity for the route segment, a first parameter determining device that determines a first parameter corresponding to a first condition between the two geographical locations, a second parameter determining device that determines a second parameter corresponding to a second condition between the two geographical locations, an additional quantity determining device that determines an additional quantity based on the first parameter and the second parameter such that the influence of the second parameter on the size of the additional quantity depends on the first parameter, a calculating device that calculates a modified quantity based on the base quantity and the additional quantity, and a signal generating device that generates a signal based on the modified quantity.

The advantages discussed in relation to the first aspect apply correspondingly to the second aspect.

According to one embodiment, the system comprises a calculating device that calculates calculating the modified quantity by summing the base quantity and the additional quantity.

According to one embodiment, the system comprises an additional quantity determining device that determines additional quantity based on a product of the first parameter and the second parameter.

According to one embodiment, the system comprises an additional quantity determining device that determines the additional quantity by scaling the second parameter based on the first parameter or determines the additional quantity by scaling the first parameter based on the second parameter.

According to one embodiment, the system comprises a comparing device that compares the first parameter to a threshold and scales the second parameter by a first factor if the first parameter exceeds the threshold and a second factor if the traffic flow falls below the threshold.

According to a third aspect, there is provided a program product comprising software instructions that, when executed in an apparatus, performs the method in accordance with the first aspect and any of the embodiments thereof.

Hence, the advantages discussed in relation to the first aspect apply correspondingly to the third aspect.

The method may be carried out by a processor within a portable navigation device such as a GPS receiver, mobile telephone or other type of portable device, for example. The portable navigation device may be configured to provide as an output (e.g. a visual display) formed from the signal generated after carrying out the method. This signal may be in the form of a modified route, time, distance, audio indication, digital electronic value or other quantity. Furthermore, the device may be used to control the movement of a vehicle such a car or lorry directly or indirectly, for example.

Generally, all terms used in the claims are to be interpreted according to their ordinary meaning in the technical field, unless explicitly defined otherwise herein. All references to "a/an/the [block, device, component, means, unit, step, etc]" are to be interpreted openly as referring to at least one instance of said block, device, component, means, unit, step, etc., unless explicitly stated otherwise. The steps of any method disclosed herein do not have to be performed in the exact order disclosed, unless explicitly stated.

BRIEF DESCRIPTION OF THE DRAWINGS

Embodiments of the system described herein will now be explained in more detail with reference to the appended drawings, where the same reference numerals will be used for similar elements, in which.

DETAILED DESCRIPTION OF VARIOUS EMBODIMENTS

Figure 1:
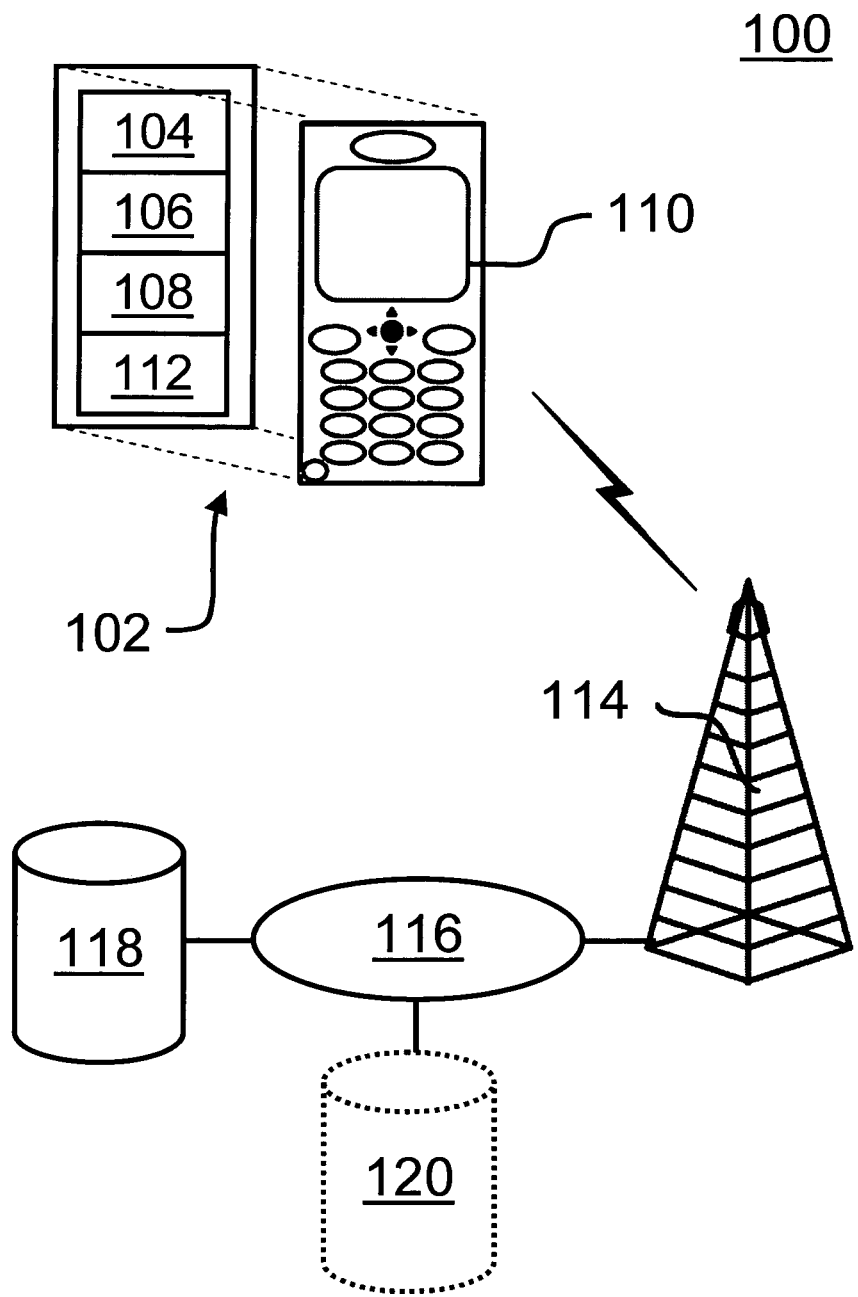
FIG. 1 schematically illustrates a system in which an embodiment in accordance with the system described herein may be used.

FIG. 1 illustrates a system 100 in which the system described herein may be applied. The system 100 comprises a user device 102. The user device 102 comprises a CPU 104, a memory 106, a transceiver 108, a display 110 and a positional unit 112 as schematically indicated in FIG. 1. The CPU 104 is operatively connected to the memory 106, the transceiver 108, the display 110 and the positional unit 112. The user device 102 may e.g. be a mobile phone, a PDA, a laptop, etc.

The positional unit 112 is arranged to determine the geographical position of the user device 102. The positional unit 112 may e.g. be a GPS receiver.

The memory 106 stores coordinate data for a plurality of geographical locations as well as data relating to how geographical locations are connected in a graph data structure as disclosed in the background section.

The transceiver 108 is a wireless transceiver enabling communication with a base station 114 of a mobile network 116 (e.g. WLAN GSM, UMTS etc.) of the system 100.

The system 100 further comprises a condition report function in the form of a server 118, hereinafter referred to as the server 118. The server 118 may be provided by a third party. The server 118 is connected to the mobile network 116 and arranged to transmit traffic condition reports and environmental condition reports to the user device 102 as will described in greater detail below. The server 118 need not be directly connected to the mobile network 116 but may be connected to the mobile network 116 via one or more other networks, such as the Internet.

A user may interact with the user device 102 via a user interface presented on the display 110. The user interface may e.g. allow the user to request a route suggestion between a starting location (e.g. a present location of the user device 102) and a destination. A route suggestion may then be calculated using any of the various methods known in the art, e.g. the Dijkstra graph-traversal algorithm as disclosed in the background section. The route suggestion may be presented graphically to the user on the display 110.

Figure 2:
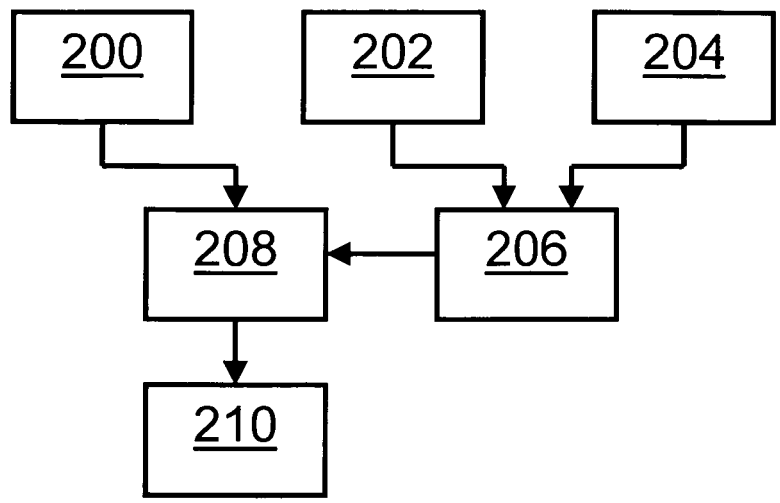
FIG. 2 schematically illustrates functional blocks for implementing an embodiment of a method in accordance with the system described herein.

In order to perform the embodiment of the method according to the system described herein, the user device 102 comprises a number of functional blocks 200, 202, . . . , 210 schematically illustrated in FIG. 2. Accordingly, the user device 102 comprises a base quantity determination block 200, a first parameter determination block 202 and a second parameter determination block 204. The first parameter determination block 202 and the second parameter determination block 204 are connected to an additional quantity determination block 206 of the user device 102. The base quantity determination block 200 and the additional quantity determination block 206 are connected to a calculation block 208 of the user device 102. The calculation block 208 is connected to a signal generator block 210 of the user device 102.

These functional blocks and their interactions may be implemented as software instructions which may be stored in the memory 106 and executed by the CPU 104. Alternatively, the functional blocks may be implemented in one or more electronic circuits, FPGAs or ASICs in the user device 102.

Figure 3:
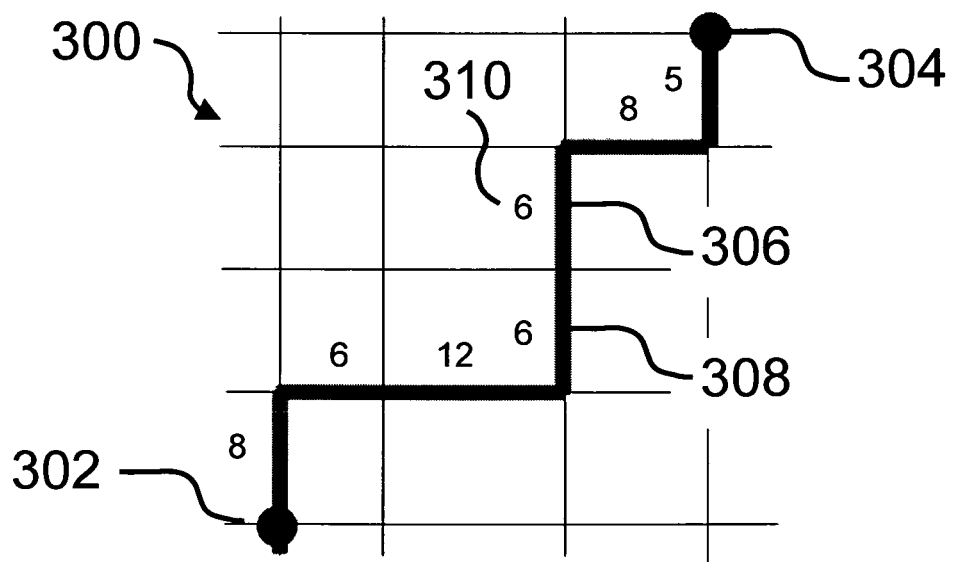
FIG. 3 schematically illustrates a route comprising a plurality of route segments.
Figure 4:
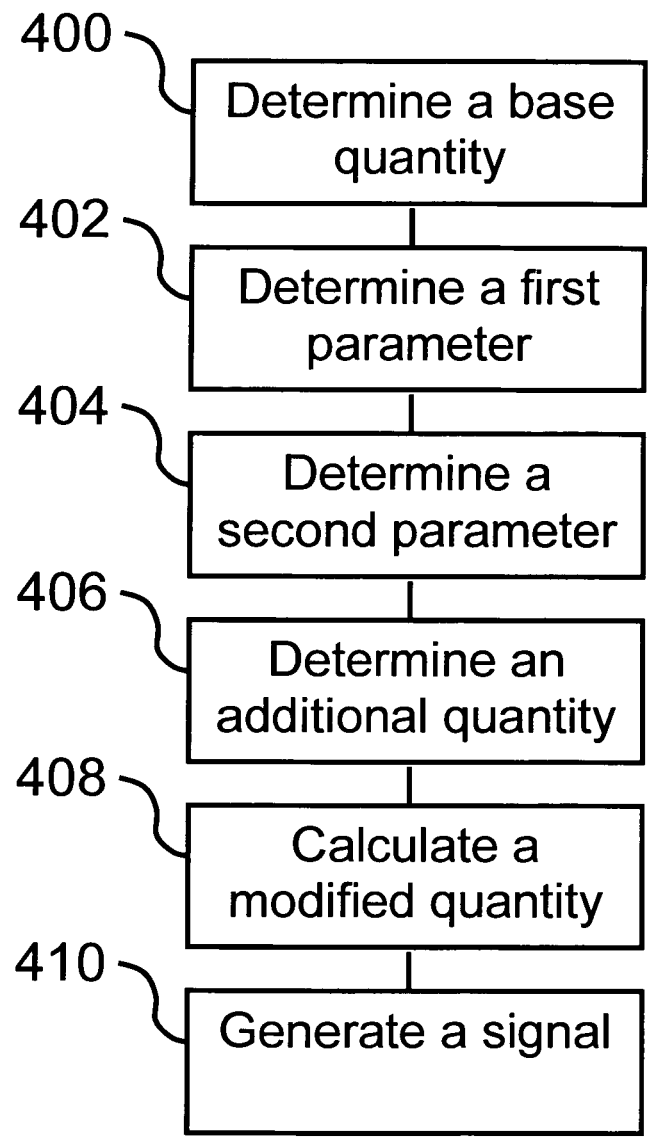
FIG. 4 is a flow chart of an embodiment of a method in accordance with one aspect of the system described herein.

In the following, the method will be described with reference FIG. 4 and to a route 300 between a starting point 302 and a destination point 304 on a digital map as schematically illustrated in FIG. 3. The starting point 302 and the destination point 304 corresponds to geographical starting and destination locations. The route 300 comprises a plurality of connected route segments 306, 308. Each route segment extends between two points on the digital map. These two points of each route segment correspond to two geographical locations. Each route segment corresponds to a road segment extending between the two geographical locations. Each route segment 306, 308 has a base quantity 310 representing a distance between the two geographical locations or an estimated time for travelling between the two geographical locations. The base quantity 310 may e.g. correspond to a ratio of the length of the road segment and the legal speed limit or otherwise determined appropriate speed along the road segment. In either case, the route 300 has been calculated using the base quantities of the route segments 306, 308.

During operation, the base quantity determination block 200 determines a base quantity 310 for the route segment 306 (step 400). The first parameter determination block 202 determines a first factor corresponding to a first condition for the road segment corresponding to the route segment 306 (step 402). The second parameter determination block 204 determines a second factor corresponding to a second condition for the road segment corresponding to the route segment 306 (step 404).

The first condition may correspond to a traffic flow along the corresponding road segment. The traffic flow may e.g. be the number of vehicles traversing the road segment per second. The traffic flow may be based on prevailing traffic flow data, predicted traffic flow data at the time of the occurrence of the second condition, and/or historical traffic flow data. The traffic flow data may be provided by the server 118 and transmitted to the user device 102. Optionally, the first parameter may comprise a ratio of the traffic flow and a traffic flow capacity for the road segment. The traffic flow capacity may be a predetermined capacity, e.g. established, estimated or calculated and provided by the server 118 or another party, and stored at or transmitted to the user device 102. Factors that may influence a traffic flow capacity of a route segment are e.g. the speed limit, the number of available lanes, the presence of curves and hills.

The second condition may be any of: an occurrence of an event along the road segment, an environmental condition along the road segment, and a road condition along said road segment. The second parameter may be based on prevailing condition data, predicted condition data, or historical condition data.

Typical events that may occur are e.g. a traffic incident, a traffic accident, loose animals on the road segment 306, traffic supervision by the police, presence of emergency vehicles, road constructions etc.

Environmental conditions may be e.g. weather conditions such as rain, snow or strong winds or other environmental conditions affecting the driving conditions such as fog or dust worsening the visibility.

Road conditions may be e.g. slippery road surface, gravel or debris on the road, low road quality (e.g. holes or crack in the road surface) etc.

The second parameter may be based on a degree of seriousness of the second condition. The second parameter may e.g. be a number indicative on the degree of seriousness of the second condition. As mentioned in the background section, in case of an incident, the second parameter may be an integer on a standardized scale.

The second parameter may be transmitted by the server 118 and received by the transceiver 108 of the user device 102.

As indicated in FIG. 2, the additional quantity determination block 206 receives the first and the second parameter as input from the first parameter determination block 202 and the second parameter determination block 204, respectively. The additional quantity determination block 206 determines an additional quantity based on the first parameter and the second parameter such that the influence of said second parameter on the size of said additional quantity depends on the first parameter (step 406). This may be achieved in a number of different ways:

According to a first example, the additional quantity may be determined based on a product of the first parameter and the second parameter (possibly weighted by some constant). If the first parameter is small, e.g. if the traffic flow along the road segment corresponding to the route segment 306 is low, the effect of the second parameter, e.g. corresponding to a condition along the road segment, on the size of additional quantity will be relatively small. However, if the first parameter is larger, e.g. if the traffic flow along the road segment is high, the effect of the second parameter on the size of the additional quantity will be larger. Purely by way of example, for a traffic flow parameter of 4 and an incident parameter of 5 the additional quantity becomes 20 whereas for a traffic flow parameter of 8 and an incident parameter of 5 the additional quantity becomes 40.

For the case of the first parameter comprising a ratio of a traffic flow and a traffic flow capacity of the route segment 306, it is realized that the effect of the second parameter on the size of the additional quantity becomes larger as the traffic flow comes closer to the traffic flow capacity of the route segment 306.

According to a second example, the additional quantity may be determined by scaling the second parameter based on the first parameter. This may expressed as:

{additional quantity}=$f$({first parameter})*{second parameter} f may for example be a power function. The exponent may be an implementation specific design parameter. Alternatively, f may be an exponential function wherein the base may be an implementation specific design parameter. Correspondingly, the additional quantity may be determined by scaling the first parameter based on the second parameter.

It is also possible to determine the additional quantity as:

{additional quantity}=$f$({first parameter})*$g$({second parameter})

where both f and g are functions (e.g. power functions or exponential functions).

According to a third example, the function f in any of the two above equations may involve comparison of the first parameter (e.g. the traffic flow) with a threshold value. The threshold value may correspond to a traffic flow capacity of the road segment as discussed above. The function f may give a first result if the traffic flow falls below the threshold value and a second result if the traffic flow equals or exceeds the threshold value. Purely by way of example, for a traffic flow parameter of 2 and a traffic flow capacity threshold value of 3, an incident parameter of 5 may result in an additional quantity of e.g. 1*5=5 whereas, for a traffic flow parameter of 4 and a traffic flow capacity threshold value of 3, an incident parameter of 5 may result in an additional quantity of e.g. 6*5=30. It is also possible to use more than one threshold value to more realistically model the combined delaying effect of traffic flow and other conditions along the road segment.

According to a fourth example, the additional quantity may be determined based on entries of a look up table (LUT) stored in the user device 102. The LUT may for example include a predetermined (e.g. precalculated, preestimated, or premeasured) additional quantity for a plurality of first and second parameter pairs, the additional quantity being such that the influence of a given second parameter entry in the LUT, on the size of the additional quantity, depends on the corresponding first parameter entry in the LUT. More specifically, the LUT may include a predetermined additional quantity for a plurality of first and second parameter pairs, the additional quantity being such that the influence of a given second parameter entry in the LUT, on the size of the additional quantity, increases with the corresponding first parameter entry in the LUT.

In response to determining the additional quantity, the additional quantity determination block 206 provides the additional quantity to the calculation block 208. The calculation block 208 further receives input from the base quantity determination block 200. In response, the calculation block 208 calculates a modified quantity for the route segment 306 based on the base quantity and the additional quantity (step 408). More specifically, the modified quantity may be calculated as a sum of the base quantity determined by the base quantity determination block 200 and the additional quantity determination block 206.

As illustrated in FIG. 2, the signal generator block 210 receives the modified quantity from the calculation block 208. In response, the signal generator block 210 generates a signal based on the modified quantity (410). The signal may e.g. be a control signal for the display 110 to indicate to the user that that a modified quantity for the route segment 306 has been calculated. Similarly, the signal may be a control signal for a loudspeaker of the user device 102. The control signal may also be a control signal comprising further instructions to be performed by the CPU 104 in response to the modified quantity. Such instructions may be e.g. to store the modified quantity in the memory 106 for later retrieval and use or to calculate a route based on the modified quantity, or to update an estimated time of arrival for an already calculated route based on the modified quantity. As a further example, the instructions may be to remove the route segment 306 from the route 300 and suggest an alternative route e.g. if the modified quantity exceeds a threshold.

In the above, the additional quantity was based on a first and a second parameter. However it is also possible to determine the additional quantity based on further parameters. E.g. the additional quantity may be determined based on a first parameter corresponding to a traffic flow, a second parameter corresponding to an incident and a third parameter corresponding to a weather condition. In that case, the additional quantity may be determined based on a product of the first, second and third parameters. The second and third parameter may both be reported to the user device 102 by the server 118. Alternatively, the second parameter may be reported by the server 118 and the third parameter may be provided by a dedicated weather report server.

In accordance with an alternative embodiment of the user device 102, the user device 102 need not comprise an integrated positional unit 112. Instead, the positional unit 112 may be an external positional unit wherein the user equipment 102 may be connected to the external positional unit by a wired link (e.g. USB) or a wireless link (e.g. Bluetooth or IR).

In accordance with a further alternative embodiment of the user device 102, the user device 102 need not comprise a dedicated positional unit 112. Instead the functionality of the positional unit 112 may be implemented in the CPU 104 wherein the geographical position of the user device 102 may be determined based on strengths of signals received by the transceiver 108 from one or more base stations e.g. using triangulation.

In any case, the user device 102 may be arranged to perform the method according to the system described herein in response to receiving traffic information or environmental information from the server 118. More specifically, the user device 102 may be arranged to perform the method according to the system described herein in response to receiving traffic information relating to a route segment of an already calculated route. However, the user device 102 may also be arranged to perform the method according to the system described herein in response to receiving traffic information relating to any route segment for which the user device 102 stores a base quantity.

In the embodiments of above, the method has been described as implemented in the user device 102. According to an alternative embodiment, the system 100 comprises a navigation server 120. The navigation server 120 stores a graph data structure including coordinate data for a plurality of geographical locations as well as data relating to how geographical locations are connected as well as base quantities for the corresponding route segments. The geographical position of the user device 102 is determined at the user device 102 and transmitted to the navigation server 120. The user device 102 may request and receive route calculations and geographical data from the navigation server 120. According to this alternative embodiment, the user device 102 hence is not required to store any geographical data.

The navigation server 120 further communicates with the server 118 via the network 116. The server 118 reports traffic information to the navigation server 120 instead of the user device 102. The navigation server 120 comprises a storage section and a processing section or one or more dedicated electronic circuits for implementing the functional blocks 200, . . . , 210 of FIG. 2 and perform the method as described above. It is also possible to implement some parts of the method according to the system described herein in the navigation server 120 and some parts in the user device 102.

According to yet another embodiment, the method according to the system described herein may be implemented in a web mapping service with road route planning functionality. The server providing the web mapping service may be connected to the Internet and implement the method according to the system described herein. The server may receive traffic information from a traffic information reporting functionality, e.g. similar to the server 118 in FIG. 1, over the Internet. A user may thus take advantage of the method according to the system described herein when requesting route suggestions from a computer connected to the Internet. A web mapping service implementing the method according to the system described herein may thus provide improved route suggestions and more accurate estimated times of arrival.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable medium and executed by one or more processors. The computer readable medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for calculating a quantity for a route segment extending between two points on a digital map, said points corresponding to two geographical locations, said quantity representing a distance between the two geographical locations or an estimated time for travelling between the two geographical locations, said method, performed using at least one processor, comprising:
   determining a base quantity for said route segment, the route segment corresponding to a road segment extending between the two geographical locations;
   determining a first parameter corresponding to a first condition of the route segment between the two geographical locations, wherein the first condition corresponds to a traffic flow along the road segment;
   determining a second parameter corresponding to a second condition of the route segment between the two geographical locations;
   determining an additional quantity based on a combined effect of said first parameter and said second parameter such that the influence of said second parameter on the size of said additional quantity depends on said first parameter;
   calculating a modified quantity for said route segment based on said base quantity and said additional quantity; and
   generating a signal based on said modified quantity.

2. The method according to claim 1, wherein calculating the modified quantity comprises calculating a sum of said base quantity and said additional quantity.

3. The method according to claim 1, wherein determining the additional quantity comprises determining the additional quantity based on a product of the first parameter and the second parameter.

4. The method according to claim 1, wherein determining the additional quantity comprises determining the additional quantity by scaling said second parameter based on said first parameter or determining the additional quantity by scaling said first parameter based on said second parameter.

5. The method according to claim 1, wherein said first parameter comprises a ratio of said traffic flow and a traffic flow capacity of said road segment.

6. The method according to claim 1, wherein said first parameter is based on prevailing traffic flow data, predicted traffic flow data, or historical traffic flow data.

7. The method according to claim 1, wherein said second condition is any one of: an occurrence of an event along said road segment, an environmental condition along said road segment, and a road condition along said road segment.

8. The method according to claim 7, wherein said second parameter is based on a degree of seriousness of the second condition.

9. The method according to claim 1, wherein said second parameter is based on prevailing condition data, predicted condition data, or historical condition data.

10. The method according to claim 1, wherein said route segment is one among a plurality of route segments forming a route.

11. The method according to claim 10, further comprising: modifying said route based on said modified quantity.

12. A system for calculating a quantity for a route segment extending between two points on a digital map, said points corresponding to two geographical locations, said quantity representing a distance between the two geographical locations or an estimated time for travelling between the two geographical locations, said system comprising:
- a base quantity determining device that determines a base quantity for said route segment, the route segment corresponding to a road segment extending between the two geographical locations;
- a first parameter determining device that determines a first parameter corresponding to a first condition of the route segment between the two geographical locations, wherein the first condition corresponds to a traffic flow along the road segment;
- a second parameter determining device that determines a second parameter of the route segment corresponding to a second condition between the two geographical locations;
- an additional quantity determining device that determines an additional quantity based on a combined effect of said first parameter and said second parameter such that the influence of said second parameter on the size of said additional quantity depends on said first parameter;
- a calculating device that calculates a modified quantity based on said base quantity and said additional quantity; and
- a signal generating device that generates a signal based on said modified quantity.

13. The system of claim 12, wherein the system is a portable navigation device.

14. A non-transitory computer readable medium storing software for calculating a quantity for a route segment extending between two points on a digital map, said points corresponding to two geographical locations, said quantity representing a distance between the two geographical locations or an estimated time for travelling between the two geographical locations, the software comprising:
- executable code that determines a base quantity for said route segment, the route segment corresponding to a road segment extending between the two geographical locations;
- executable code that determines a first parameter corresponding to a first condition of the route segment between the two geographical locations, wherein the first condition corresponds to a traffic flow along the road segment;
- executable code that determines a second parameter of the route segment corresponding to a second condition between the two geographical locations;
- executable code that determines an additional quantity based on a combined effect of said first parameter and said second parameter such that the influence of said second parameter on the size of said additional quantity depends on said first parameter;
- executable code that calculates a modified quantity for said route segment based on said base quantity and said additional quantity; and
- executable code that generates a signal based on said modified quantity.

15. The non-transitory computer readable medium according to claim 14, wherein the executable code that calculates the modified quantity includes executable code that calculates a sum of said base quantity and said additional quantity.

16. The non-transitory computer readable medium according to claim 14, wherein the executable code that determines the additional quantity includes executable code that determines the additional quantity based on a product of the first parameter and the second parameter.

17. The non-transitory computer readable medium according to claim 14, wherein the executable code that determines the additional quantity includes executable code that determines the additional quantity by scaling said second parameter based on said first parameter or executable code that determines the additional quantity by scaling said first parameter based on said second parameter.

18. The non-transitory computer readable medium according to claim 14, wherein said route segment corresponds to a road segment extending between the two geographical locations.

* * * * *